United States Patent [19]

Shibata et al.

[11] Patent Number: 4,540,490

[45] Date of Patent: Sep. 10, 1985

[54] APPARATUS FOR FILTRATION OF A SUSPENSION

[75] Inventors: Setsuo Shibata, Handa; Yukihiko Koshiba, Yokohama; Yoshito Hamamoto, Kurashiki; Katsutoshi Kugai, Handa; Akiro Kawashima, Yokohama; Hiroshi Fujisawa, Fujisawa, all of Japan

[73] Assignee: JGC Corporation, Otemachi, Japan

[21] Appl. No.: 484,156

[22] Filed: Apr. 12, 1983

[30] Foreign Application Priority Data

Apr. 23, 1982 [JP] Japan .................................. 57-67141
Apr. 23, 1982 [JP] Japan .................................. 57-67142

[51] Int. Cl.³ ............................................ B01D 29/24
[52] U.S. Cl. ............................ 210/323.2; 210/333.01; 210/412; 210/433.2
[58] Field of Search .................... 210/433.2, 409, 412, 210/798, 333.01, 323.2

[56] References Cited

U.S. PATENT DOCUMENTS 2,570,132 10/1951 Koupal .............................. 210/184
3,637,079 1/1972 Strub ......................... 210/333.01 X
4,002,567 1/1977 Konno et al. ................ 210/433.2 X

FOREIGN PATENT DOCUMENTS 555460 1/1957 Italy ............................... 210/333.01

Primary Examiner—Frank Spear
Attorney, Agent, or Firm—Bucknam and Archer

[57] ABSTRACT

An apparatus for filtering a suspension by at least one aggregate of membranes made of a high molecular weight compound porous hollow fibers to separate a filtrate from the suspended matter contained in the suspension, backwashing the aggregate of membranes with a backwashing gas to clean it and minimizing the amount of suspended matter entrained by the backwashing gas, and repeating the filtration and backwashing alternately, comprises a filtering vessel divided into a feed region and a filtrate region, the filtrate region being above the feed region, an inlet for the suspension at the feed region, an outlet for the filtrate at the filtrate region, an inlet for a backwashing gas in the filtrate region, an outlet for the backwashing gas in the feed region, a partition plate in the filtering vessel to support the aggregate of membrane filters and to divide the inteior of the filtering vessel into the filtrate region and the feed region, an outlet for a portion of the suspension in the feed region at a position lower than the outlet for the backwashing gas, a cylindrical protective case for housing the aggregate of membranes.

4 Claims, 4 Drawing Figures

APPARATUS FOR FILTRATION OF A SUSPENSION

This invention relates to an apparatus for filtration of a liquid containing a suspended matter by the use of hollow fiber type porous polymeric membranes fixed to one another but each kept opened at their upper end and each closed but kept loose at the lower end. More particularly, it relates to an apparatus characterized by preventing the suspended matter-containing liquid, that is a suspension, from being entrained with a backwashing gas to the outside of the apparatus when the membranous filter used is cleaned by the backwashing gas.

The hollow fiber type porous polymeric membranes (the membrane filters being hereinafter referred to as "hollow fiber type membrane" for brevity) have been industrially used for ultrafiltration and reverse osmosis since they provide a large filtrate area and have excellent pressure resistance and chemical resistance.

However, the said hollow fiber type membrane will allow the suspended matter to be attached to the surface thereof in an increasing amount with the lapse of filtration time, whereby it gradually decreases in filtering performance. As a means of regenerating the filtering performance, there has been proposed a method which comprises continuously introducing air into the filter system through the route opposite to that taken during the filtration opertion not only to generate numerous air bubbles at the membrane thereby peeling the suspended matter attached thereto, but also to vibrate the membrane with the introduced air thereby removing the suspended matter (Japanese Pat. Appln. Laid-Open Gazette No. 53-108882).

The above method so proposed enables the suspended matter deposited on the membrane to be effectively peeled from it. However, it is disadvantageous in that since the backwashing with air is effected in a filter vessel filled with the suspension to be filtered, such an amount of the suspension corresponding to a portion of the suspention overflowing the filter vessel due to washing with air will be necessarily carried over with the air through the outlet for the backwashing air to the outside of the vessel. If the suspended matter contained in the suspension so carried over to the outside of the filler vessel is radioactive suspended matter discharged from nuclear power station, harmful material-containing suspended matter discharged from food, medical and chemical industrial facilities, or the like, it is not desirable that the air containing such suspended matter be introduced to the outside of the filtering system so that environmental pollution or contamination is widely spread.

The backwashing gases used herein may include inert gases, such as air or nitrogen, which are inert to liquids or suspended matters to be treated. Among the inert gases, air and nitrogen are particularly practical.

In the filter vessel, it is desirable that the hollow fiber-type membranes aggregates be each housed in a protective case in order to prevent them from being entangled with each other and consequently damaged.

An object of this invention is to provide a process for preventing the widespread of contamination by minimizing the amount of suspension entrained or accompanied with the backwashing gas.

A second object is to provide a filtration apparatus for carrying out the said process.

A third object is to provide a protective case for housing a hollow fiber type membrane aggregate therein.

These objects are achieved by providing (1) a process comprising preliminarily removing from a filter vessel a to-be-filtered suspension in such an amount as to correspond with a portion of the suspension overflowing the filter vessel due to backwashing with a gas therein when the hollow fiber-type membrane aggregates are cleaned by gas backwash techniques, (2) an apparatus for carrying out the process and (3) a protective case for housing the hollow fiber-type membrane aggregates.

More particularly, in a process comprising filtration of a suspension with at least one aggregate of hollow fiber-type membranes so as to separate the filtrate and then cleaning the membrane filters with a backwashing gas to remove the suspended matter attached to the membrane filters, the process of this invention is characterized in that the suspension with which the filter vessel is filled is preliminarily removed from the vessel in such a specified amount as to correspond with a portion of the suspension overflowing the vessel due to backwashing with the gas through the membranous filters and then the gas backwashing is effected.

In a filtration apparatus comprising a filtrate compartment provided with an outlet for filtrate and an inlet for backwashing gas, a to-be-filtered suspension compartment provided with an inlet for a to-be-filtered suspension, an outlet for a suspension and an outlet for a backwashing gas and at least one aggregate of hollow fiber-type membrane filters, the suspension being filtered by the membrane filter to separate a filtrate from the suspension and then the membrane filters being cleaned with the backwashing gas, the filtration apparatus of this invention is characterized in that a partition plate is provided not only to support said membrane but also to separate the suspension compartment from the filtrate compartment in the filter vessel and that an outlet for the overflowing suspension is provided at the suspension compartment, at a position lower than the outlet for the backwashing gas.

The process and apparatus for filtration of a suspension as well as the protective case for housing the membrane filters will be explained hereunder in more detail.

The hollow fiber-type, membranes used in this invention may be used for microfiltration or ultrafiltration and they will allow compressed air to bubble out at one side of the membranes when the compressed air is introduced into the other side. Conventional hollow fiber-type membranes for ultra-filtration include those having a dense structure layer as the active membrane; those of the conventional membranes, which will not allow a compressed gas to bubble out therethrough when the compressed air is directed to the membranes, are not useful for the process of this invention. The hollow fiber-type membranes used herein may be produced, by a wet or dry method, from cellulose acetate, polyacrylonitrile, methacrylic acid esters, polyamides, polyesters, polyvinyl alcohol, polyolefins or the like.

Particularly, the membranes produced from polyvinyl alcohol (PVA) have a structure in which fine pores of about 0.02–2 $\mu$m in average diameter are substantially uniformly arranged over the cross section of the membrane, and they have a bubble point of 0.1–20 atm. thereby facilitating the generation of bubbles. Thus, they are excellent as a hollow fiber-type membrane used in this inventron. The hollow fiber-type membrane used herein consist of at least one aggregate or bundle of several tens-several hundred thousands of hollow fibers each having an outer diameter of about 300–3000 μm and a wall thickness of about 50–500 μm. At least one of such aggregates or bundles is used as the hollow fiber-type membrane in the filtering apparatus.

In order to prevent the breakage of aggregates of the hollow fiber-type membrane, caused by these aggregates interfering with each other, it is desirable to protect the aggregates by holding or housing them in a protective case such as a cylindrical one. More particularly, the backwash technique is effective in peeling or removing from the membranes the suspended matter attached thereto, however, the passage of a backwashing gas through the aggregated membranes will vibrate and spread them particularly at the lower part whereby they tangle with each other and tend to cause the breakage or damage thereof. Thus, there have been used some methods comprising protecting the aggregated membranes by housing them in a lengthwise case. However, this still does not give a suitable case for use as a protective case for the aggregates of membrane filters.

The protective case of this invention is of such a structure as to permit an effective and satisfactory backwashing and it is extremely useful particularly for the treatment of a liquid containing a harmful material such as radioactive suspended matter. Thus, the protective case in which an aggregate or aggregates of the hollow fiber-type membrane are installed according to this invention is characterized by the fact that:

(1) the case itself is a piece of a cylindrical pipe,
(2) the case is provided with at least one outlet for the used backwashing gas at a position which is higher than the lower end of a tape-like body surrounding the aggregate of hollow fiber-type membranes fixed to one another at their upper end portion and is adjacent to the fixed portion of the hollow fiber-type membranes and
(3) the lower end of the case is lower than that of the aggregate of hollow fiber-type membranes.

The cylindrical case of this invention may be made of a stainless steel, plastic or the like. When it is attempted to dispose of the hollow fiber-type membrane aggregates used, they may be subjected to disposition by incineration as they are housed in a case if the case is one made of plastics; therefore, if such aggregates housed in a plastic-made case treat a radioactive suspended matter-containing liquid and are then disposed of by incineration as they are housed in the plastic-made case, secondary radioactive wastes derived from the incinerated materials will be produced in smaller amounts.

The suspended matter-containing liquids referred to in this invention include radioactive liquid wastes discharged from nuclear power stations as well as harmful material-containing liquid wastes discharged from food, medical and chemical industries.

In addition, it is necessary that the pressure of compressed air used for cleaning with backwashing air be such that many bubbles are generated through the membrane filters. The pressure used is in the range of 0.1–20 atm., preferably 2–5 atm.

The amount of the to-be-removed overflowing portion of a suspension prior to backwashing with a gas according to this invention should essentially be such that the suspension is substantially not entrained with the backwashing gas. The removal of the predetermined portion of the suspension may be effected through a to-be-filtered suspension outlet provided in the lower part of the filter vessel or the removal of the overflowing portion of the suspension may be effected through the overflowing suspension outlet provided in a portion of the filter vessel lower than the outlet for a backwashing gas.

This invention will be explained hereunder by reference to the accompanying drawings in which.

Figure 1:
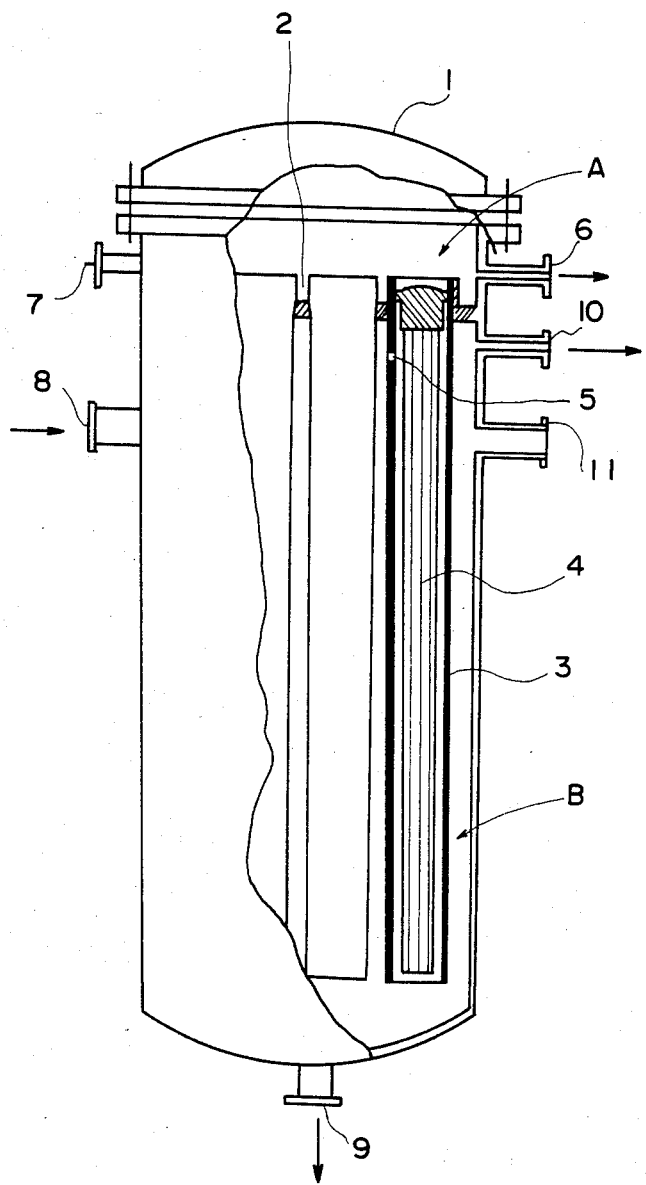
FIG. 1 is a sectional view of an example of filtration apparatus, partly exploded, of this invention.

Referring now to FIG. 1, the filtration apparatus of this invention will be detailed below.

A filter vessel houses aggregates 4 of hollow fiber-type membranes and is partitioned with a partition plate 2 into the upper and lower regions which are a filtrate region A and a feed region B, respectively. The partition plate 2 is also fitted with one to several protective cylindrical cases 3 in each of which the aggregate of hollow fiber membranes 4 is housed. The cylindrical cases 3 are each provided in the wall with at least one hole 5.

The filtrate region A of the filter vessel 1 is provided with an outlet 6 for a filtrate and an inlet 7 for a backwashing gas, and the feed region B is provided with an inlet 8 for a suspension, an outlet 9 for the suspension and an outlet 10 for a backwashing gas. Further, the feed region B is provided with an outlet 11 for an overflowing portion of the suspension, which constitutes the important portion of this invention, at a position lower than the outlet 10 for the backwashing gas.

The filtration process using the above filtration apparatus of this invention will be detailed.

A liquid containing a suspended material (that is, a suspension) is introduced through the suspension inlet 8 into the feed region B of the filter vessel 1. The suspended material is intercepted or filtered off by the aggregate of hollow fiber membranes 4 to obtain a filtrate which is passed through the inside of the hollow fibers to the filtrate region A and then discharged through the filtrate outlet 6 to the outside of the vessel 1. The suspended matter is attached to or deposited on the membrane filters in an increasing amount as the filtration proceeds, so as to decrease the filtering performance of the membrane filters. The filtration operation is stopped at this point and a backwashing gas is then forced into the inside of the hollow fibers of the aggregates 4 through the backwashing gas inlet 7 provided at in the filtrate region A. In this case of introduction of the backwashing gas under pressure, it is necessary to keep the membranes of the aggregates 4 immersed in the liquid since the backwashing efficiency will decrease if the membranes with the suspended matter deposited thereon are dried. The backwashing gas passes through the finely porous membranes of the aggregates 4 to form numerous bubbles thus simultaneously peeling the deposited suspended material for cleaning of the membranes, after which the backwashing gas is discharged through the backwashing gas outlet 10 from the filter vessel 1. At this point the liquid containing a large amount of suspended matter foams and increases in apparent volume by a volume equal to the volume of holdup of the backwashing gas in the liquid, and the increment of apparent volume of the foamed suspension is then entrained with the backwashing gas and overflows through the backwashing gas outlet 10. In cases where the suspension so entrained with the gas is one containing a radioactive suspended matter as previously mentioned, such entrainment must be minimized since it tends to spread contamination caused by the radioactive material.

In order to substantially eliminate this disadvantage in the practice of this invention, the amount of suspension corresponding to the holdup of backwashing gas is discharged, prior to backwashing with the gas, from the filter vessel 1 through the overflowing suspension outlet 11 provided at a position lower than the backwashing gas outlet 10 and then the backwashing gas is carried out, whereby the amount of the suspended matter-containing liquid entrained through the gas outlet 10 is minimized.

There will be illustrated hereinbelow a process for cleaning a radioactive liquid containing a radioactive suspended matter by the use of a filtration apparatus.

Liquids containing radioactive wastes and radioactive liquids containing radioactive aqueous wastes or the like must be thoroughly disposed of under very strict conditions from the view-point of safety. For this purpose, the filtration process and apparatus of this invention may be conveniently used.

Figure 2:
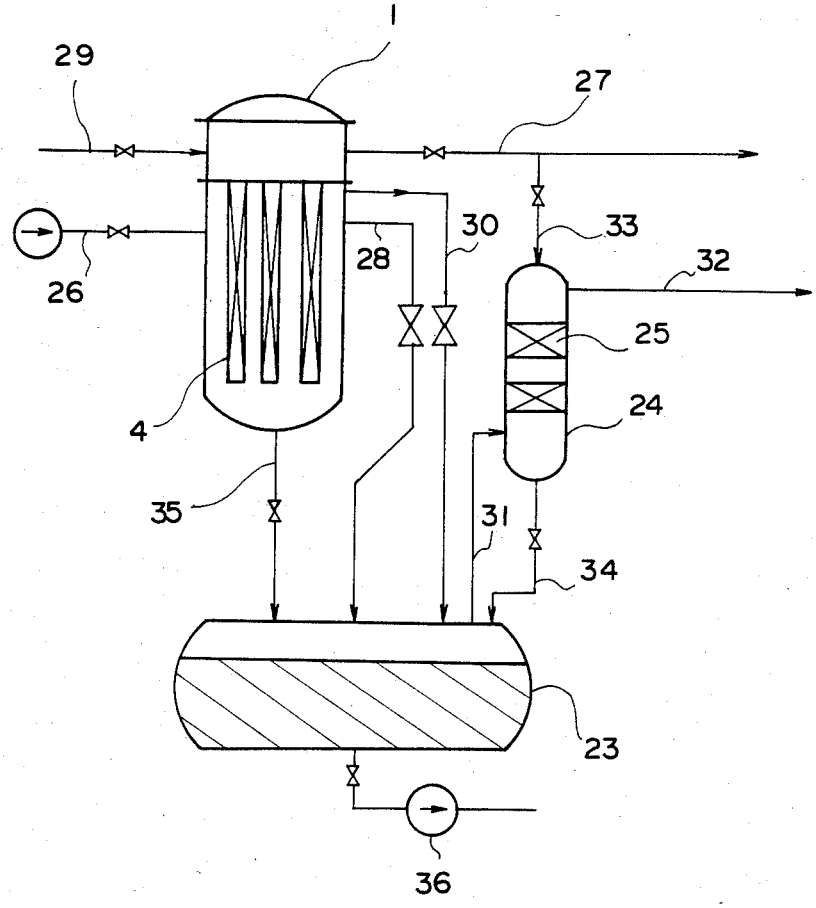
FIG. 2 is a flow sheet showing a process of this invention for cleaning a radioactive suspension using a filtration apparatus according to this invention.

Referring now to FIG. 2 which shows a process for cleaning a radioactive liquid using an apparatus of this invention, numeral 1 shows a filter vessel in which hollow fiber-type membranes 4 are housed. Numeral 23 is a tank which receives an overflowing liquid from the filter vessel 1. Numeral 24 is a unit for cleaning the used backwashing gas, in which a demister 25 is housed.

A radioactive liquid containing a radioactive suspended matter is introduced through a liquid supply line 26 to the filter vessel 1. The liquid so introduced is filtered by the hollow fiber-type membranes 4 to filter out or remove the radioactive suspended matter thereby obtaining a filtrate. The filtrate so obtained is introduced through a filtrate line 27 to the outside of the filter vessel 1 for reuse as a cleaned liquid or discharged from the system. When a suspended matter deposits on the membranes 4 thereby to lower the filtering performance, a backwashing gas is forcibly sent through the membrane 4 to restore the performance. According to the process of this invention, however, the liquid in the filter container is partly introduced, prior to sending the backwashing gas into the filter vessel, through an overflowing liquid discharge line 28 into an overflowing liquid receiving tank 23 to an extent that the liquid level in the tank 23 reaches the level of an overflowing liquid discharge outlet leading to the discharge line 28. Then, air is forced through a backwashing gas supply line 29 into the filter vessel 1 to peel and remove the radioactive suspended matter deposited on the membranes 4 therefrom.

The backwashing gas is passed through a backwashing gas discharge line 30 to the outside of the filter vessel 1. Since the overflowing liquid is discharged through the overflowing liquid discharge line 28 to the outside of the filter vessel 1, the backwashing gas discharged through the gas discharge line 30 will hardly entrain the liquid containing the suspended matter. In this case, however, it is still necessary to remove even a slight amount of the suspended matter contained in the liquid entrained with the discharged backwashing gas because of the radioactivity of the radioactive liquid.

Thus the backwashing gas with mist containing a minute amount of the suspended matter, which is passed through the backwashing gas discharge line 30, is received temporarily in the overflowing liquid tank 23.

The backwashing gas so received in the tank 23 is freed of the minute amount of the suspended matter, passed through a backwashing gas line 31 to the backwashing gas cleaning unit 24 housing a demister 25 filled with wire mesh to remove the remaining suspended matter entirely from the gas and then discharged through a cleaned gas discharge line 32. In addition, in order to prevent an increase of level of radioactivity of piping extending to the outlet of the desister 25 in the backwashing gas cleaning unit 24, the increase being caused by the mist attached to the piping, the filtrate obtained in the filter vessel 1 is passed, as required, through a cleaning liquid line 33 as a by-pass line for the filtrate to the cleaning unit 24 for cleaning the piping. The filtrate which has been used for the cleaning is then passed through a used cleaning liquid discharge line 34 to the overflowing liquid tank 23.

The backwashed liquid containing a concentrated suspended matter in the filter vessel 1 is passed through a backwashed liquid discharge line 35 to the overflowing liquid tank 23. The liquids so collected in the tank 23 is passed by a pump 36 to a storage tank, a plastic, bitumen or cement solidification facility, or the like.

The protective case 3 which may preferably be used in this invention will be detailed hereinbelow by reference to FIG. 3.

Figure 3:
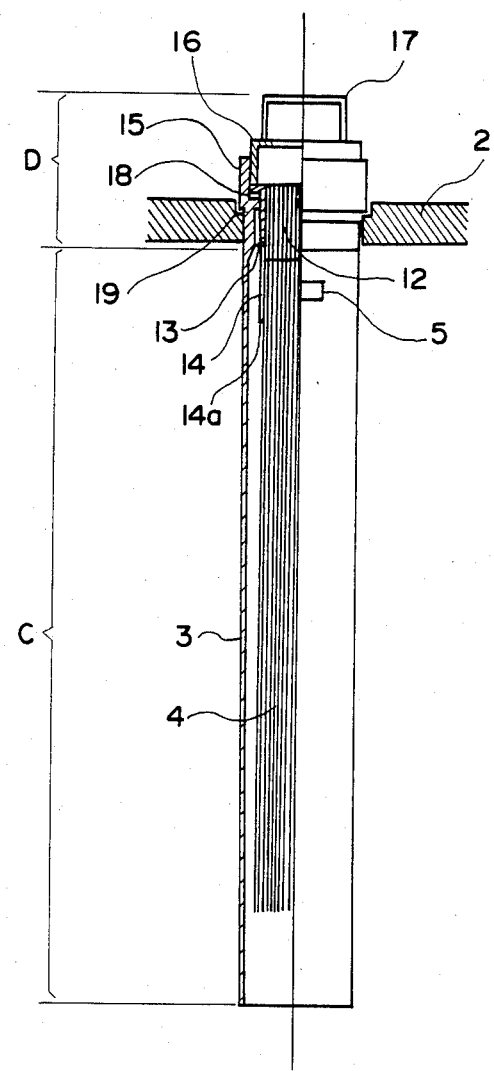
FIG. 3 is a sectional view of a protective case according to this invention.

Referring to FIG. 3, in the protective case 3, the many hollow fibers of the aggregate of hollow fiber membranes 4 are fixed together at their upper end with a binder and closed at their lower end with a binder. In this manner, they are fixed together at the upper end with the upper end being kept open and are free at the portion other than the upper end with the lower end being closed (the fiber fixed portion of the hollow fibers being hereinafter indicated by numeral 12). Further, the fiber fixed portion 12 is wound by a tape-like body 14 made of Vinylon (polyvinyl alcohol-derived synthetic fibers) woven cloth, rubber or the like to form a protective layer for the fiber fixed portion 12. It is preferable that the upper portion of the tape-like body 14 be attached to the fixed portion 12.

A fitting assembly D for fitting the fiber fixed portion 12 to the partition plate 2, comprises a fitting cylinder 15 screwed to the partition plate 2 at the hole for receiving the fitting assembly D and the hollow fiber aggregate 4 held therein, a frange 13 provided at the upper part of the fiber fixed portion 12 and a fixing cylinder 16 for pressing down and fixing the flange 13. The fixing cylinder 16 is screwed into the fitting cylinder 15. At the top of the fitting cylinder is provided a grip 17 for screwing the fitting cylinder 15 housing the aggregate of hollow fiber membranes 4 into said receiving hole of the partition plate 2. Numerals 18 and 19 indicate packings, respectively.

The protective case 3 is a cylinder which has a smooth inner surface and is, at the bottom, open and, at the top, screwed into or bonded to the lower part of the fitting cylinder 15.

The protective case 3 in which the aggregate of hollow fiber membranes 4 has been inserted and fixed, is provided with one or several holes 5 for discharging a gas therethrough, the hole or holes so provided being positioned adjacent to the fiber fixed portion 12 of the aggregate of hollow fiber membranes 4 and higher than the lower end 14a of the tape-like body 14 surrounding the aggregate of hollow fiber membranes 4.

The gas outlet hole or holes 5 are used to discharge through it a backwashing gas which, at the time of backwashing, is introduced into the inside of the aggregate of hollow fiber membranes 4 and passed along the inner wall of the protective case 3. If the gas outlet hole or holes 5 are positioned lower than the tape-like body 14, then, at the time of backwashing, the hollow fibers will accompany the discharging gas to protrude through the hole or holes thereby being damaged and the portion of the hollow fibers which is not immersed in the liquid is not well backwashed since in this case the liquid level in the feed region B is made lower than the tape-like body 14. The cross-section of the gas outlet hole or holes may be in the circular, square, circumferentially directed slit or like shape.

The inner diameter of the protective case 3 should most suitably be determined depending on the outer diameter of the hollow fiber-like aggregate of hollow fiber membranes 4 to be housed in the case 3. The use of a protective case having too small an inner diameter will result in decreasing the movement of the hollow fibers and backwashing efficiency, while the use of a protective case having too large an inner diameter will result in spreading out the free ends of the hollow fibers and tending to cause the damage or breakage of the fibers.

It is necessary that the inner diameter of the protective case 3 be larger than the outer diameter of the aggregate of hollow fiber membranes 4 by 20-100% of the outer diameter. For example, if the aggregate of hollow fiber membranes 4 used has an outer diameter of 60 mm then a protective case 3 for housing the aggregate 4 should suitably have an inner diameter of 70-120 mm. It is also necessary that the lower end of the protective case 3 be positioned lower than that of the aggregate of hollow fiber membranes 4 whereby the aggregate 4 is entirely protected.

In an operation for the exchange of the hollow aggregate of hollow fiber membranes 4 in the filter vessel 1 for treating ordinary industrial wastes therein, it is customary to exchange only the aggregate of hollow fiber membranes 4. In this case, the exchange thereof may be carefully affected since this is effected by workers positioned near the scene of the filter vessel. In addition, in cases where the protective case 3 for housing the aggregate of hollow fiber membranes 4 therein is used, it is also customary to fix the protective case 3 entirely securely to the filter vessel 1.

On the other hand, in an operation for the exchange of the aggregate of hollow fiber membranes 4 in the filter container 1 for treating radioactive wastes therein, it is desired to exchange a fresh aggregate of hollow fiber membranes for the used one 4 in the filter container 1 by remote control since it is difficult for workers for performing the operation to approach the scene of the operation because of the radioactivity. Even if it is possible for the workers to approach the scene, it is necessary to effect the exchange in a short time in order that the radioactive radiation on the workers is minimized. Further, the aggregate of hollow fiber membranes 4 is not very strong and, therefore, it is apt to be damaged or broken when it is handled carelessly. Thus, in cases where radioactive wastes are to be treated with the aggregate of hollow fiber membranes 4 and this aggregate is damaged at the time of, for example, fitting it in the filter vessel, the repair or reexchange of the damaged aggregate will be very difficult since the workers cannot approach the scene due to the radioactivity.

For this reason, it is necessary to eliminate the damage of the aggregate of hollow fiber membranes 4 by fitting it to or releasing it from the filter vessel as it is housed in the protective case 3.

The problem as to radioactive exposure on workers will be solved by firstly fitting the aggregate of hollow fiber membranes 4 to the protective case 3, bringing the protective case 3 housing the filter aggregate 4 into the filter vessel 1 and then engaging the protective case 3 with the partition plate 2 with aid of such a means as to allow the protective case 3 to easily engage with or easily disengage from the partition plate 2. Thus, the above fitting process is preferred in the practice of this invention. The means aiding the engagement is illustrated by the fitting assembly D in FIG. 3.

This invention will be better understood by the following examples.

EXAMPLE 1

There were provided 3000 hollow fibers which were made of a polyvinyl alcohol (PVA) type polymer and had an outer diameter of 900 $\mu$m, an inner diameter of 450 $\mu$m, a purified water permeating rate (K) of 200 l/hr·atm·m$^2$ (area of membrane of the hollow fibers being calculated from the outer wall surface of the fibers), a bubble point of 1.5 atm. and an effective length of 100 cm. The hollow fibers so provided were fixed to one another (seal fixed) at the upper end and closed at the lower end with a binder without fixing the lower portions of the fibers to one another so as to form the free lower portions; in this manner, they formed an aggregate of hollow fiber membranes as indicated in FIG. 1. The membrane area of the thus formed aggregate was 7 m$^2$. Thirteen (13) of such aggregates were housed in a filter vessel as shown in FIG. 1, used for filtration of a suspension and then backwashed with air to measure the amount of suspended matter entrained with the backwashing air as detailed hereunder.

The suspension to be filtered contained 5 ppm of iron oxide having an average particle size of 0.6 $\mu$m as the suspended matter. This suspension was introduced into the filter vessel as shown in FIG. 1 and then filtered. The membrane filters allowed the iron oxide to be attached thereto in an amount of 30 g/m$^2$, after which air was passed at a pressure of 3.5 Kg/cm$^2$·G for 5 minutes countercurrently with the suspension at the time of filtration to collect with glass wool the suspended matter contained in the air discharged from the filter vessel. The holdup of the air at the time of backwashing was about 20% and the suspension in the filter vessel contained the suspended matter in a concentration of 13000 ppm after the backwashing. The results are as follows:
 (1) In the case of non-removal of suspension prior to backwashing: 2.01 mg/m$^3$ air
 (2) In the case of removal of suspension prior to backwashing: 0.01 mg/m$^3$ air It is apparent from the above that the amount of suspended material entrained in the backwashing air in a case where the portion of the suspension corresponding to the holdup of the backwashing air was removed prior to backwashing with the air, could be reduced to 1/200 of that in a case where no portion of the suspension was removed prior to backwashing.

As is seen from the foregoing, the process and apparatus of this invention are suitably useful for filtration of a suspension since they prevent the suspension from being entrained with a backwashing gas when the hollow fiber-type membranes used are cleaned with the backwashing gas.

The following examples are intended to specifically show the effects or advantages of the protective case which is preferable for use in this invention.

EXAMPLE 2

Figure 4:
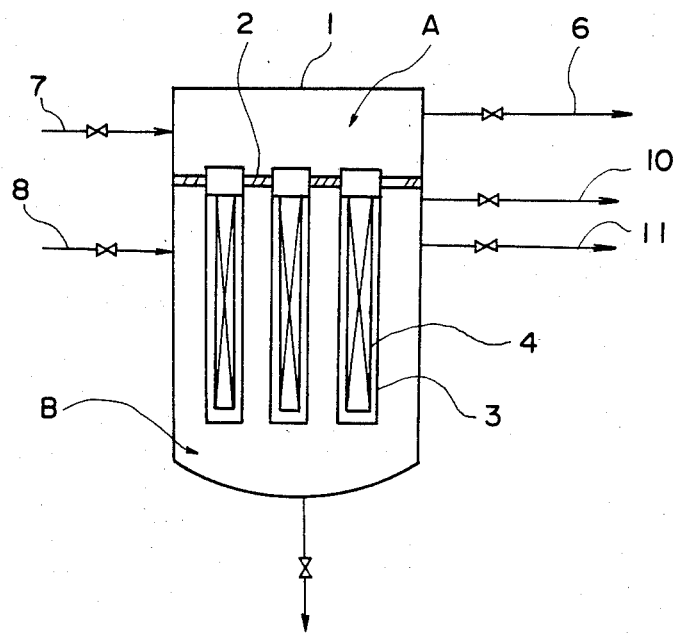
FIG. 4 is a diagrammatic sectional view of another example of a filtration apparatus of this invention.

There was provided a filter vessel wherein three (3) of the same aggregate of hollow fiber membranes as used in Example 1 were installed as shown in FIG. 4. Using a protective case as shown in FIG. 3 and a suspension containing about 5 ppm of iron oxide as the material to be filtered, filtration of the suspension and backwashing of the aggregates of hollow fiber membrane were alternately repeated in the filter vessel so provided.

The protective case used herein had an inner diameter of 96 mm, a length of 1050 mm, a bottom opening area of 72 cm$^2$, 3 air outlet holes and an overall area of 24 cm$^2$ of these air outlet holes. Each of the aggregates of hollow fiber membrane had an outer diameter of 60 mm.

The alternate filtering and backwashing operations were performed for a total of 170 days during which a total of 170 times of backwashing operations were performed, with the result that interferences of the aggregates of hollow fiber membrane with each other were not found at all, the efficiency of backwashing with the air was satisfactory and the overall backwashing of the aggregate of hollow fiber membrane could be effected satisfactorily.

EXAMPLE 3

A test for backwashing was made by repeating only backwashing with air without carrying out filtration, using a filter vessel as shown in FIG. 4.

A total of 1000 times of backwashing were repeated with the result that the aggregates of hollow fiber membrane used were not found at all to have been damaged and entangled together.

EXAMPLE 4

There were provided a filter container wherein were installed 12 of the same aggregates of hollow fiber membrane as used in Example 1, the aggregates being housed respectively in suitable protective cases. The filter vessel so provided was used to alternately repeat filtration of a suspension containing about 0.1 ppm of iron rust and backwashing of the used filter aggregates. The result is that no operational problems were raised and the use of the protective case according to this invention was found to enable a filtration apparatus to be scaled up.

EXAMPLE 5

In a case where after a protective case had been installed in the same filter vessel as used in Example 2, three (3) aggregates of hollow fiber membranes were inserted in the protective case to be fitted to it, the insertion of the aggregates was carefully carried out so that the hollow fiber-type membranes were not damaged in view of spreading of the hollow fibers at their lower position and, therefore, it took about 45 minutes for the fitting of the aggregates to be completed; on the other hand, in a case where after three aggregates of the hollow fiber membranes had been inserted in the protective case to be fitted to it, it took 3 minutes for the fitting of the aggregates to be completed. In addition, the fitting of the protective case to the filter vessel was effected by screwing. Further, the insertion of the aggregate of hollow fiber membrane into the protective case was effected by placing the aggregate of hollow fiber membrane in a polyvinyl chloride-made cylindrical bag, inserting the aggregate-containing polyvinyl chloride-made bag into the protective case and then withdrawing only the bag from the protective case through the bottom opening. If, in this case, only the cylindrical bag is pulled up from the protective case through the top opening, the aggregate of hollow fiber membrane will undesirably be bent upward.

As mentioned above, the protective cases according to this invention enable the prevention of entanglement and damage of the aggregates of hollow fiber membrane and they may therefore be suitable for use as such for the aggregates of hollow fiber membrane. Furthermore, in cases where radioactive wastes are treated, it is desirable that the aggregate of hollow fiber membrane be inserted into the protective case prior to fitting of the protective case to the filter vessel.

What is claimed is:

1. An apparatus for filtering a suspension by means of at least one aggregate of membrane comprising high molecular weight compound-made porous hollow fibers to separate a filtrate from the suspended matter contained in the suspension, backwashing the at least one aggregate of membrane filters with a backwashing gas to clean it and minimizing the amount of suspended matter entrained by the backwashing gas, and repeating the filtration and backwashing alternately, comprising a filtering vessel divided into a feed region and a filtrate region, the filtrate region being above said feed region, an inlet for the suspension at the feed region, and outlet for the filtrate at the filtrate region, an inlet for a backwashing gas in the filtrate region, an outlet for the backwashing gas in the feed region, a partition plate in the filtering vessel to support said aggregate of membrane filters and to divide the interior of the filtering vessel into said filtrate region and said feed region, an outlet for a portion of said suspension in the feed region at a position lower than the outlet for the backwashing gas, a cylindrical protective case for housing the at least one aggregate of membrane filters therein, the protective case being open at the bottom and being fixed at the upper end to the partition plate, the inner diameter of said cylindrical protective case being greater than the outer diameter of the aggregate of membrane filters by 20 –100%, the cylindrical case being provided with at least one opening, wherein the hollow fibers of the aggregate of the membrane filters are fixed at the upper end thereof by a tape-like body, the upper ends of said hollow fibers being opened, the lower ends thereof being closed, said opening being located higher than the lower end of said tape-like body, and is adjacent to said fixed portion of the hollow fiber-type membranes and the lower end of said protective case is positioned lower than the lower end of the aggregate of hollow fiber membranes.

2. The apparatus according to claim 1 wherein said membrane filters are made from polyvinyl alcohol, have fine pores of 0.02-2 μm diameter and bubble point of 0.1-20.

3. The apparatus according to claim 1 wherein said case is provided with at least one opening adjacent the fiber fixed portion of said membranes and higher than the lower end of the tape body of said membranes, the upper portion of said tape body being attached to said fixed portion.

4. The apparatus according to claim 1 which comprises a plurality of hollow fiber membranes and a plurality of protective cases.

* * * * *